Dec. 21, 1965   H. H. BURKITT   3,224,796
WALL BUSHING FOR PIPES AND CABLES
Filed Aug. 10, 1962
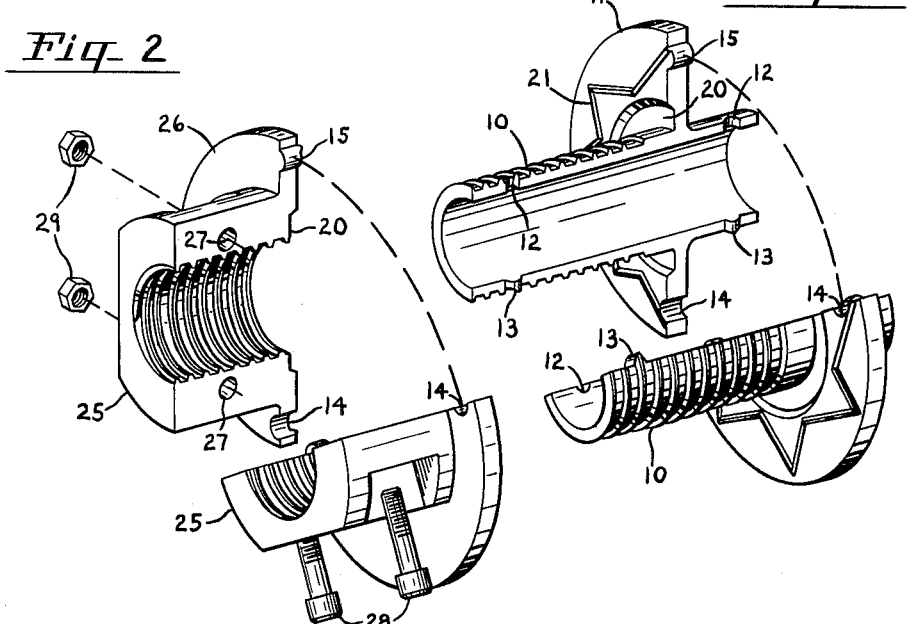
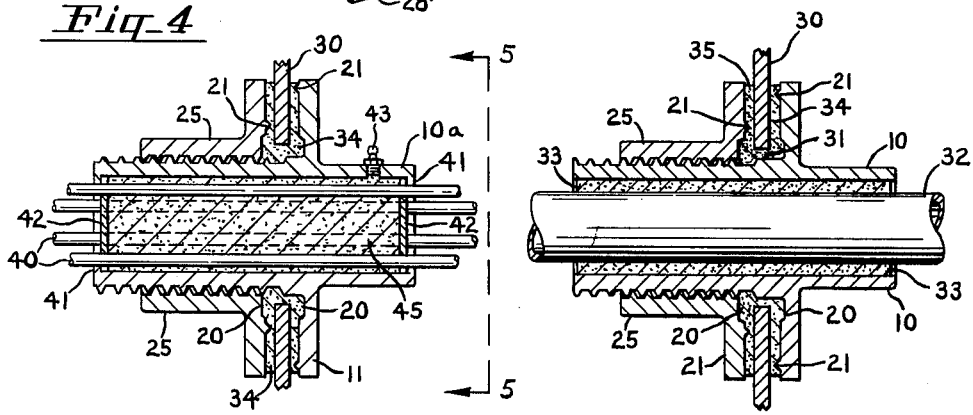
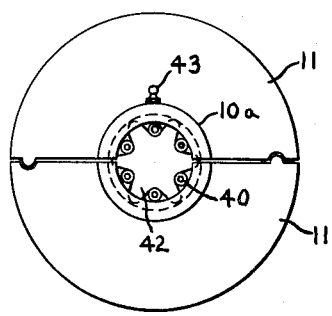
INVENTOR.
HAROLD H. BURKITT
BY
Lee R. Schermerhorn
Attorney

United States Patent Office 3,224,796
Patented Dec. 21, 1965

3,224,796
WALL BUSHING FOR PIPES AND CABLES
Harold H. Burkitt, 4777 SE. 16th Ave., Tigard, Oreg.
Filed Aug. 10, 1962, Ser. No. 216,154
2 Claims. (Cl. 285—161)

This invention relates to a bushing for sealing a pipe or cables in a wall opening.

The invention is not limited to any special field of use but has particular utility in ship construction and repair where various kinds of pipes, conduits and cables pass through watertight bulkheads and the like. It has been common practice to weld such pipes and conduits rigidly in the bulkhead opening but this has often resulted in metal failure in or adjacent the weld as a result of vibration and expansion and contraction and other strains incident to slight movements between the pipes and wall plates.

Objects of the present invention are, therefore, to provide a bushing for the general purposes described, to provide a bushing which will allow slight movements of the pipes or conduits relative to the wall, to provide a bushing which is relatively easy to apply and to provide a bushing which is especially adaptable to repair work.

The present bushing is made in four parts which are easy to assemble on an existing pipe, conduit or group of cables by a single workman. Two of the parts constitute a split hollow bolt and the other two constitute a split nut. The hollow bolt is adapted to contain plastic sealing compound to seal the pipe or cables in the bolt while at the same time permitting small movements from vibration, expansion and contraction of steam pipes and the like. Provision is also made for similarly sealing the bushing in the wall opening.

The foregoing and other objects and advantages will become apparent and the invention will be better understood from the following description of certain preferred embodiments illustrated on the accompanying drawing. Various changes may be made, however, in the details of construction and arrangement of parts and all such modifications within the scope of the appended claims are included in the invention.

In the drawing:

FIGURE 1 is a perspective view of the two halves of the split bolt of the present device;

FIGURE 2 is a similar view of the split nut;

FIGURE 3 is a longitudinal sectional view showing the bushing installed on a pipe in a wall opening;

FIGURE 4 is a similar view of a modification for use with cables; and

FIGURE 5 is a view taken on the line 5—5 of FIGURE 4.

In FIGURE 1, the two bolt halves 10, 10 are identical whereby they may be cast in a single mold for economy of construction. When put together, the two halves form an externally threaded tubular bolt with a radial flange 11 adjacent an unthreaded end. In order to hold the two halves in register longitudianlly, one of the mating edges is provided with notches 12 and the other edge is provided with projecting tongues 13. The tongues of one part fit in the notches of the other part in an obvious manner. Similarly, to hold the parts in transverse register, one side of the flange 11 is provided with a notch 14 and the other side is provided with a tongue 15. With this arrangement of the tongues and notches, a pair of identical castings will fit and mate properly together.

The side of flange 11 facing the threaded portion of the bolt is provided with an annular recess 20, and outwardly from this recess the flange is formed with a sharp edged ridge 21, preferably of irregular outline but, in any event, of non-circular configuration. This ridge has a configuration such that when the two halves are assembled, the ends of the ridge on one part join the ends of the ridge on the other part. Thus, when the flange 11 is placed against one face of a wall, the ridge 21 will form and enclose a hollow space in communication with the space in recess 20.

The nut halves 25 are also identical and preferably provided with notches 14 and tongues 15 in their flange portions 26. This flange also is equipped with a recess 20 and a ridge 21 on its side which is adapted to abut the opposite side of the wall from the bolt flange. The nut halves are also equipped with smooth transverse holes 27 to receive bolts 28 which with the nuts 29 secure the two halves of the nut together on the bolt.

The parts are shown in assembled relation on a wall plate 30 in FIGURE 3. Wall plate 30 contains a hole 31 through which passes the pipe 32. First, the two bolt halves are assembled on the pipe on the right side of the wall and projected through opening 31. Prior to placing the bolt halves in position, the interior hollow in the bolt is filled with a quantity of viscous plastic sealing material 33 such as mastic, which does not harden with age, and the recess 20 and adjacent space within the outline of ridge 21 has been similarly filled with the same sealing compound as indicated at 34.

Proceeding then to the left side of wall 30, the two nut halves are assembled on the projecting end of the bolt and fastened together loosely with bolts 28 and nuts 29. When the recess 20 and space within the confines of ridge 21 on the nut are filled with sealing compound, the nut may be screwed up to the face of the wall so as to pull the bolt flange 11 up snugly against the opposite face of the wall. Then, by alternately screwing the nut on the bolt and tightening the clamping bolts 28, the bushing may be made tight in the wall opening. This tightening operation may be performed entirely from the left side of the wall because the irregular outline of ridge 21 tends to bite into the wall and hold the bolt against turning. This feature obviates the necessity for a second workman on the right side of the wall to hold the bolt while the nut is being tightened.

The wall opening is thereby completely sealed by the two masses of sealing compound 33 and 34 which are confined within the outlines of the ridges 21 on the flanges of the bolt and nut. During the tightening of the nut, surplus mastic will be squeezed out beyond these ridges as shown and any excess may be wiped off. In FIGURE 3 the nut 25 has not been completely tightened. The bolt is long enough to hold the mastic 33 around the pipe with sufficient retention to withstand standard pressure testing procedures for ship bulkheads. Since the mastic never hardens, slight movements of the pipe from vibration or expansion and contraction do not break the seal.

FIGURE 4 shows a modified form of bushing for a plurality of electric cables or small conduits 40. In this case the nut 25 is the same as the nut in FIGURE 2 but the split bolt 10a has certain added features. The ends of the bolt are equipped with inturned flanges 41 to provide retention for a pair of star plates 42. The bolt halves are assembled on the star plates with the cables 40 disposed in the spaces between the star points, as shown in FIGURE 5 whereby the star plates and cables substantially close the ends of the bolt. One of the projecting bolt halves is drilled and tapped to receive a conventional lubricating fitting 43. Then, after the bushing parts have been assembled and mounted, the interior space around the cables 40 is filled with sealing compound 45 through the fitting 43 until the compound begins to ooze out of the spaces between the star points at opposite ends of the bushing. With a viscous sealing compound and a bolt having a length several times its diameter, these apertures are small enough that the compound will withstand the standard pressure tests without blowing out of the bushing. When nut 25 is tightened, the ridges 21 bite into opposite sides of the wall plate to confine the sealing compound 34 as in the first embodiment.

Thus, with the present bushing, a single pipe or conduit or a plurality of small conduits or cables may be effectively and expeditiously sealed in a wall or bulkhead opening without resort to welding.

Having now described my invention and in what manner the same may be used, what I claim as new and desire to protect by Letters Patent is:

1. A wall clamping conduit bushing for sealing a wall opening about a conduit passing through said opening, comprising a hollow split bolt adapted to receive said conduit and a sealing compound, a flange on said bolt for engaging one side of the wall, a sharp, axially extending ridge on said flange extending around said bolt defining a recess for receiving sealing compound on said one side of the wall, a split nut on said bolt having a flange for engaging the opposite side of the wall, an axially extending ridge on said flange extending around the bolt defining a recess for sealing compound on said opposite side of the wall, means connecting said nut halves rigidly together on said bolt so that the nut may be turned on the bolt to clamp the wall, said ridge on said bolt flange being arranged to bite into the wall and having a non-circular configuration to prevent turning of the bolt when the nut is tightened so that the nut may be tightened from said opposite side of the wall without holding the bolt on the one side of the wall.

2. A wall having a conduit extending through an opening therein, a wall clamping bushing for sealing said opening about said conduit, said bushing comprising a hollow split bolt containing said conduit and a sealing compound, a flange on said bolt engaging one side of the wall, a sharp, axially extending ridge on said flange extending around said bolt and defining a recess in which is disposed a sealing compound on said one side of the wall, a split nut on said bolt having a flange engaging the opposite side of the wall, an axially extending ridge on said flange extending around the bolt and defining a recess in which is disposed a sealing compound on said opposite side of the wall, means connecting said nut halves rigidly together on said bolt so that the nut may be turned on the bolt to clamp the wall, said ridge on said bolt flange biting into the wall and having a non-circular configuration preventing the turning of the bolt when the nut is tightened so that the nut may be tightened from said opposite side of the wall without holding the bolt on the one side of the wall.

References Cited by the Examiner

UNITED STATES PATENTS

| | | | |
|---|---|---|---|
| 858,899 | 7/1907 | McNutt | 285—206 |
| 940,739 | 11/1909 | Schlussler. | |
| 1,472,794 | 11/1923 | Foley | 285—206 |
| 1,805,155 | 5/1931 | Weeks | 285—158 |
| 2,431,154 | 11/1947 | Wikstorm | 285—158 |
| 2,813,692 | 11/1957 | Bremer | 285—294 |
| 2,867,680 | 1/1959 | Strecher | 285—373 |
| 3,092,360 | 6/1963 | Cook. | |

FOREIGN PATENTS 958,466   9/1949   France.

CARL W. TOMLIN, *Primary Examiner.*

THOMAS F. CALLAGHAN, *Examiner.*